(12) United States Patent
Kawamura et al.

(10) Patent No.: US 12,318,989 B2
(45) Date of Patent: Jun. 3, 2025

(54) METHOD FOR MANUFACTURING RESIN WIDE-MOUTHED CONTAINER, MANUFACTURING DEVICE, AND RESIN WIDE-MOUTHED CONTAINER

(71) Applicant: NISSEI ASB MACHINE CO., LTD., Nagano (JP)

(72) Inventors: Ryo Kawamura, Nagano (JP); Atsushi Nagasaki, Nagano (JP); Manabu Ogihara, Nagano (JP); Tomokazu Komiyama, Nagano (JP); Muneyoshi Aikawa, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 91 days.

(21) Appl. No.: 17/921,526

(22) PCT Filed: Apr. 26, 2021

(86) PCT No.: PCT/JP2021/016683
§ 371 (c)(1),
(2) Date: Oct. 26, 2022

(87) PCT Pub. No.: WO2021/221024
PCT Pub. Date: Nov. 4, 2021

(65) Prior Publication Data
US 2023/0173734 A1    Jun. 8, 2023

(30) Foreign Application Priority Data
Apr. 27, 2020    (JP) ................................. 2020-078536

(51) Int. Cl.
*B29C 49/06*    (2006.01)
*B29C 45/26*    (2006.01)
(Continued)

(52) U.S. Cl.
CPC .............. *B29C 49/06* (2013.01); *B29C 45/26* (2013.01); *B29C 49/42* (2013.01); *B65D 1/16* (2013.01);
(Continued)

(58) Field of Classification Search
CPC ..... B29C 49/06; B29C 49/063; B29C 49/071; B29C 49/42392; B29C 49/42394; B29C 49/42824; B29C 49/6427; B29C 49/643
See application file for complete search history.

(56) References Cited

U.S. PATENT DOCUMENTS 3,941,539 A * 3/1976 Saumsiegle ........... B29C 49/063
425/525
3,944,645 A * 3/1976 Farrell .................. B29C 49/063
264/237
(Continued)

FOREIGN PATENT DOCUMENTS

CA    2981967 A1 *  6/2017  ........... B29C 45/261
JP    2003-170487 A    6/2003
(Continued)

OTHER PUBLICATIONS

English Machine Translation of RU-2468973 C2 (Year: 2011).*
(Continued)

*Primary Examiner* — Robert B Davis
(74) *Attorney, Agent, or Firm* — Greenblum & Bernstein, P.L.C.

(57) ABSTRACT

A method for manufacturing a resin wide-mouthed container includes at least: injection-molding a bottomed preform made of resin; and blow-molding the injection-molded preform. During the injection molding, the preform is injection-molded such that an overhanging section overhanging outward is formed on an outer peripheral section of a first lip section closer to a first body section than a flange section,
(Continued)

and while the first lip section, which is provided with the overhanging section, is held by a lip mold, which has a recessed section that engages with the overhanging section, the preform is separated from an injection molding die.

12 Claims, 7 Drawing Sheets

(51) Int. Cl.
  *B29C 49/42* (2006.01)
  *B65D 1/16* (2006.01)
  *B29C 49/48* (2006.01)
  *B29K 67/00* (2006.01)
  *B29L 31/00* (2006.01)

(52) U.S. Cl.
  CPC .......... *B29C 2049/4881* (2022.05); *B29K 2067/003* (2013.01); *B29L 2031/7132* (2013.01)

(56) References Cited

U.S. PATENT DOCUMENTS

2010/0104885 A1* 4/2010 Blakeborough ......... B44D 3/12
                                                      264/537
2018/0079127 A1    3/2018  Aoki
2019/0337218 A1   11/2019  Kawamura et al.
2022/0143897 A1    5/2022  Kawamura et al.

FOREIGN PATENT DOCUMENTS

| JP | 2004-010061 A | 1/2004 | |
| JP | 2004-115064 A | 4/2004 | |
| JP | 2004-352332 A | 12/2004 | |
| JP | 2017-098673 A1 | 6/2017 | |
| JP | 2020-37272 | 3/2020 | |
| RU | 2468973 C2 * | 11/2011 | ............ B65D 1/023 |
| WO | 11-188779 A | 7/1999 | |

OTHER PUBLICATIONS

Mechanical translation of Fukai dated 2017. (Year: 2017).*
International Search Report, Written Opinion of the International Searching Authority and International Preliminary Report on Patentability issued in International Application No. PCT/JP2021/016683, dated May 25, 2021, along with an English translation thereof.

* cited by examiner

METHOD FOR MANUFACTURING RESIN WIDE-MOUTHED CONTAINER, MANUFACTURING DEVICE, AND RESIN WIDE-MOUTHED CONTAINER

TECHNICAL FIELD

The present invention relates to a manufacturing method and a manufacturing apparatus for manufacturing a resin wide-mouth container, and a resin wide-mouth container.

BACKGROUND ART

Patent Literature 1 discloses a cup-shaped polyester container formed of a sheet material. Patent Literature 2 discloses a plastic wide-mouth container manufactured by a cold parison-type biaxial stretch blow molding method. Patent Literature 3 discloses a packaging cup container molded by stretching and blowing polyethylene terephthalate (PET).

CITATION LIST

Patent Literature

Patent Literature 1: JP2004-115064A
Patent Literature 2: JP2004-010061A
Patent Literature 3: JP2004-352332A

SUMMARY OF INVENTION

Technical Problem

In a method of molding a wide-mouth container from a sheet material, a cost of the sheet material is generally high, and it is necessary to perform post-processing such as trimming after vacuum molding or press molding. In addition, in the molding method of using the sheet material, the container itself is likely to be scratched, so that it is difficult to mold a wide-mouth container having an excellent appearance. Further, in the method of molding a wide-mouth container by the cold parison-type biaxial stretch blow molding method, although some frictional scratches are generated on an outer surface, it is possible to manufacture a wide-mouth container that is superior in appearance to the above method. However, the cost increases.

On the other hand, in a stretch blow molding method that is a hot parison-type (ISBM method), injection molding of a preform of a container and stretch blow molding of the preform can be performed in one manufacturing step. If the manufacturing time can be shortened in the ISBM method, it is possible to provide a container having an excellent appearance while reducing the cost. As disclosed in WO2019/078358, there is a method of demolding a preform at a high temperature in an injection molding step, as a means for shortening the manufacturing time in the ISBM method. However, it has been found that in a case where a wide-mouth container is manufactured by the ISBM method, the preform is likely to be detached from a neck mold when demolding of the preform from an injection cavity mold or an injection core mold in the injection molding step.

An object of the present invention is to provide a manufacturing method and a manufacturing apparatus for manufacturing a resin wide-mouth container capable of favorably manufacturing a wide-mouth container, and a novel resin wide-mouth container.

Solution to Problem

A manufacturing method for manufacturing a resin wide-mouth container according to one aspect of the present invention is a manufacturing method, being a hot parison-type, for manufacturing a resin wide-mouth container, the manufacturing method at least including:

an injection molding step of injection-molding a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and a blow molding step of blow molding the injection-molded preform to manufacture a resin wide-mouth container, in which, in the injection molding step, molten resin is injected into a space in a shape of the preform to injection-mold the preform, the space being formed by mold-clamping an injection core mold, an injection cavity mold, and a lip mold such that a protruding portion protruding outwardly is formed on an outer peripheral portion of the first lip portion closer to the first body portion than the flange portion, and the first lip portion including the protruding portion is held by the lip mold including a concave portion configured to engage with the protruding portion, to demold the preform from an injection molding mold.

A manufacturing apparatus for manufacturing a resin wide-mouth container according to one aspect of the present invention is a manufacturing apparatus, being a hot parison-type, for manufacturing a resin wide-mouth container, the manufacturing apparatus at least including:

an injection molding part configured to injection-mold a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and a blow molding part configured to blow molding the injection-molded preform to manufacture a resin wide-mouth container, in which the injection molding part is configured to inject molten resin into a space in a shape of the preform to injection-mold the preform, the space being formed by mold-clamping an injection core mold, an injection cavity mold, and a lip mold, in which the lip mold includes a lip outer periphery defining portion configured to define an outer peripheral portion, excluding the flange portion, of the first lip portion of the preform, and in which the lip outer periphery defining portion includes a concave portion configured to define a protruding portion protruding outwardly on an outer peripheral portion of the first lip portion closer to the first body portion than the flange portion.

A resin wide-mouth container according to one aspect of the present invention is a resin wide-mouth container including:

a bottom portion;
a body portion continuous with the bottom portion; and a lip portion having a cylindrical wide mouth continuous with the body portion on an opposite side of the bottom portion, where the lip portion includes a flange portion provided at an edge located on an opposite side of the bottom portion and protruding outwardly, and a protruding portion provided on an outer peripheral portion of the lip portion closer to the body portion than the flange portion and protruding outwardly, and in which an outer diameter of the lip portion is a maximum diameter of the wide-mouth container.

Advantageous Effects of Invention

According to the present invention, it is possible to provide the manufacturing method and the manufacturing apparatus for manufacturing a resin wide-mouth container capable of favorably manufacturing a wide-mouth container, and the novel resin wide-mouth container.

DESCRIPTION OF EMBODIMENTS

Hereinafter, an embodiment of the present invention will be described with reference to the drawings. Note that, for convenience of description, the dimension of each member shown in the present drawings may be different from the dimension of each actual member.

Figure 1:
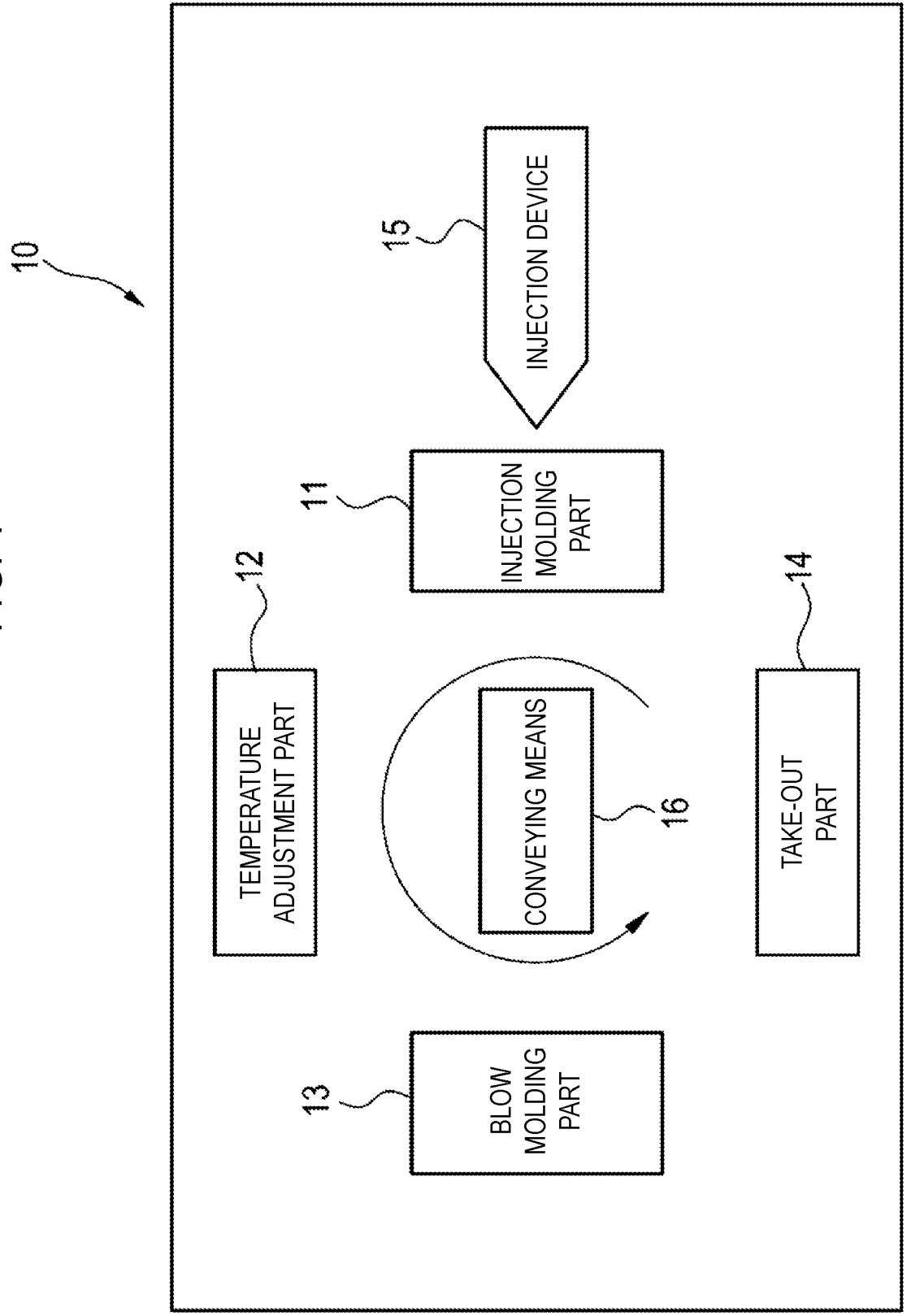
FIG. 1 is a schematic view showing a manufacturing apparatus for manufacturing a resin wide-mouth container according to an embodiment.

First, a manufacturing apparatus 10 for manufacturing a resin wide-mouth container will be described with reference to FIG. 1. FIG. 1 is a functional block diagram of the manufacturing apparatus 10.

As shown in FIG. 1, the manufacturing apparatus 10 is a hot parison-type apparatus including an injection molding part 11 for manufacturing a resin wide-mouth container preform, a temperature adjustment part 12 for adjusting a temperature of the manufactured preform, a blow molding part (an example of a blow device) 13 for blowing the preform to manufacture a container, and a take-out part 14 for taking out the manufactured container. An injection device 15 configured to supply a resin material as a raw material is connected to the injection molding part 11.

The injection molding part 11, the temperature adjustment part 12, the blow molding part 13, and the take-out part 14 are provided at positions rotated by predetermined angles (90 degrees in the present embodiment) about a conveying means 16. The conveying means 16 includes a rotation plate or the like. The conveying means 16 is configured to support the preform or a wide-mouth container by a lip mold 20 attached to the conveying means 16 shown in FIGS. 2A and 2B that will be described later and to convey the preform or the wide-mouth container to each part with rotation of the rotation plate.

Figure 2A:
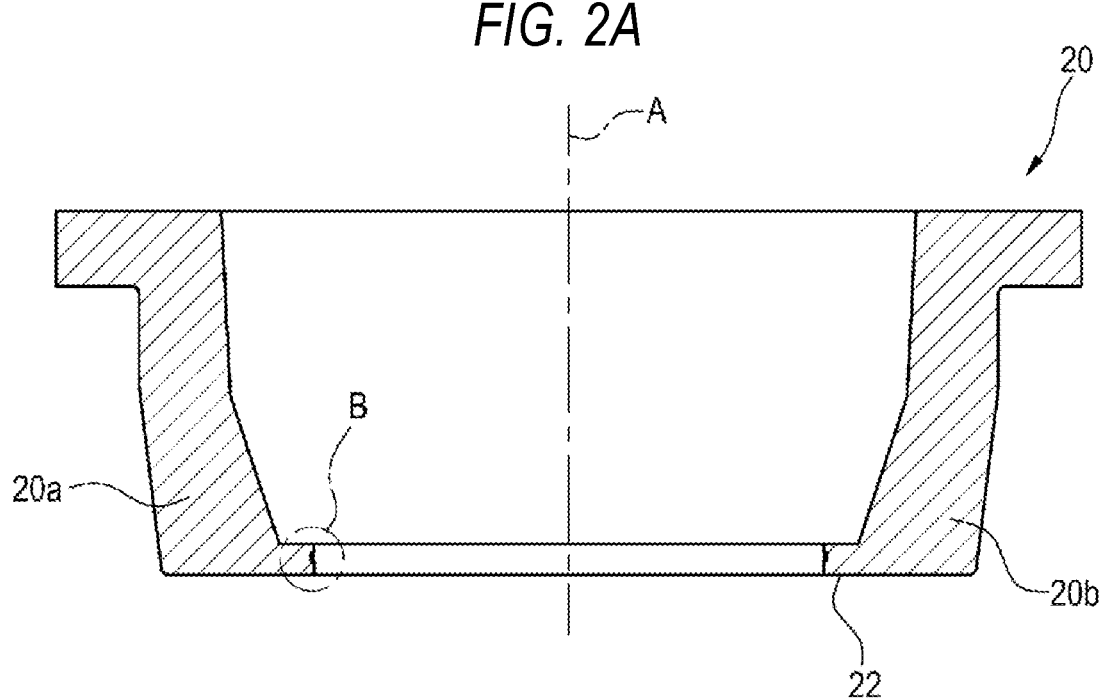
FIG. 2A is a view showing a lip mold provided to the manufacturing apparatus for manufacturing a resin wide-mouth container according to the embodiment.
Figure 2B:
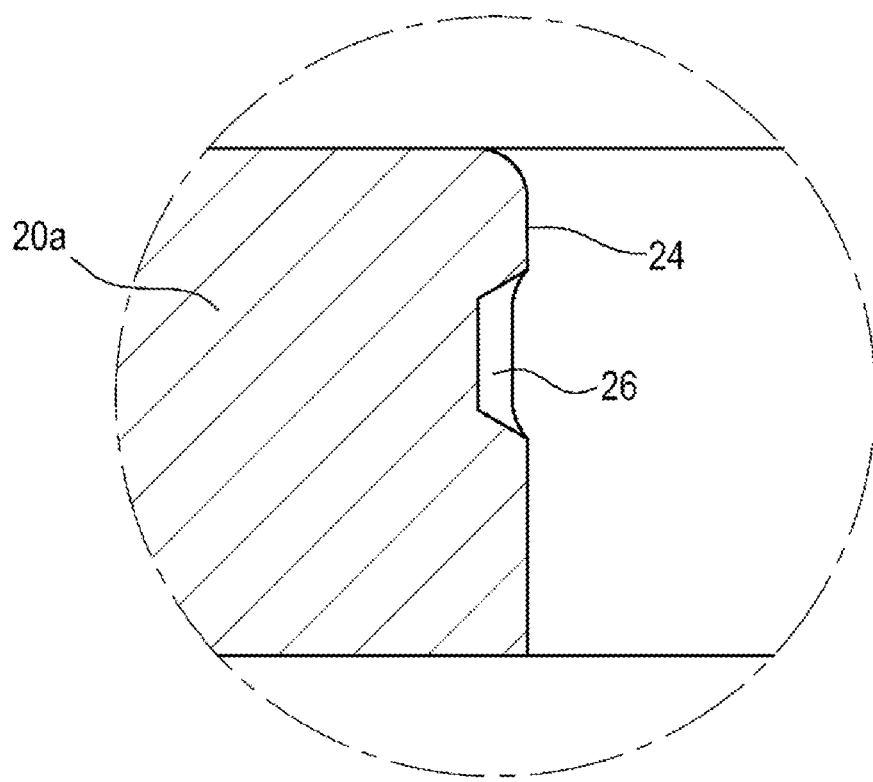
FIG. 2B is a partially enlarged view of a region B shown in FIG. 2A.

Here, the lip mold 20 will be described with reference to FIGS. 2A and 2B. FIG. 2A is a cross-sectional view obtained by cutting the lip mold 20 along a plane along a central axis line A thereof, and FIG. 2B is a partially enlarged view of a region B in FIG. 2A. The lip mold 20 is configured to be capable of supporting or releasing a preform or a wide-mouth container in conjunction with an opening and closing operation of two split molds 20a and 20b (for example, movement in a right and left direction in FIG. 2A). The lip mold 20 has a substantially cylindrical shape in a state where the two split molds 20a and 20b are closed. The lip mold 20 has a holding portion 22 configured to hold a lip portion of the preform or the wide-mouth container in a closed state.

Figure 3:
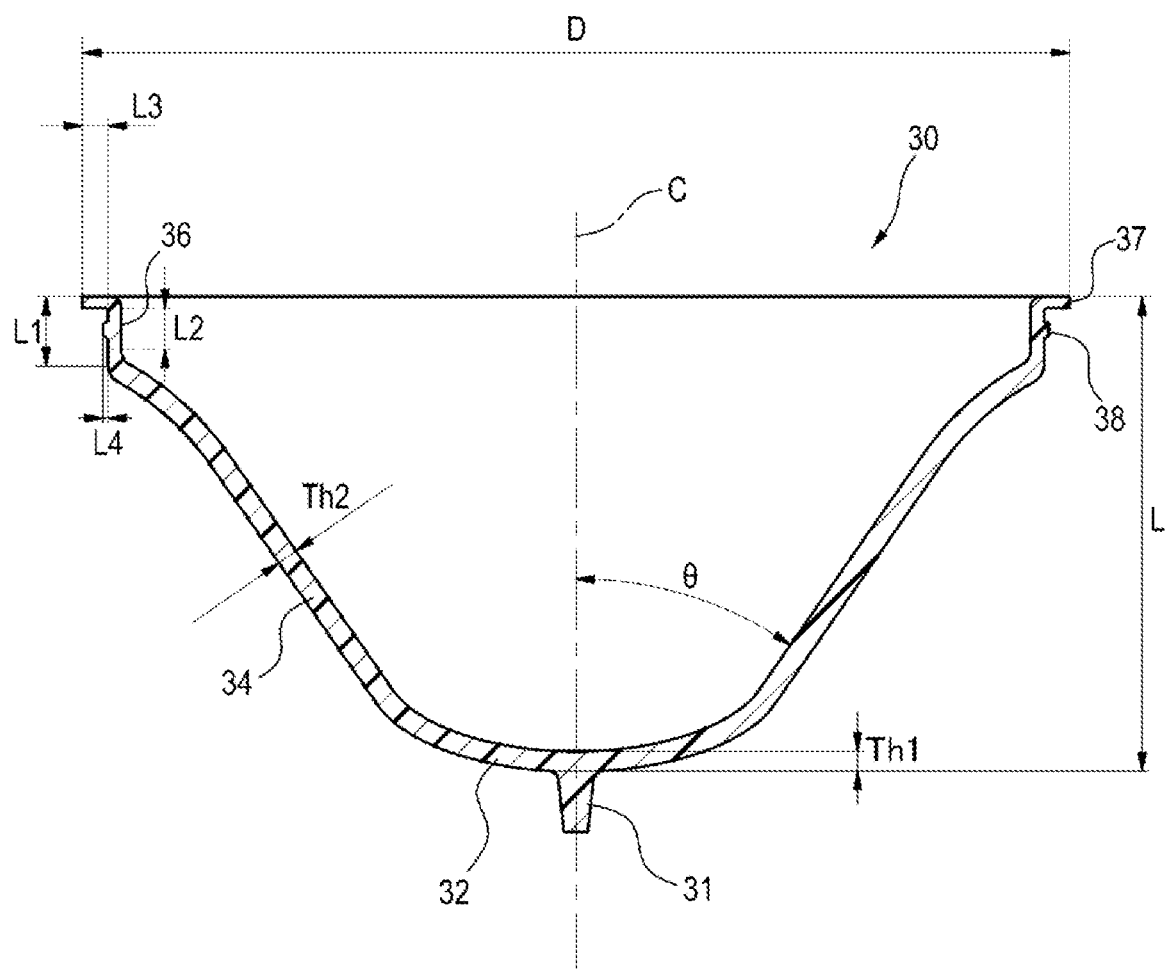
FIG. 3 is a view showing a preform of a resin wide-mouth container according to the embodiment.

Here, with reference to FIG. 3, a preform 30 that is molded by the manufacturing apparatus 10 of the present embodiment will be described. FIG. 3 is a cross-sectional view obtained by cutting the preform 30 along a plane along a central axis line C thereof. The preform 30 is a resin bottomed molded product including a first bottom portion 32, a first body portion 34 continuous with the first bottom portion 32, and a first lip portion 36 with a cylindrical wide mouth continuous with the first body portion 34 on an opposite side of the first bottom portion 32. A diameter D of the first lip portion 36 may be, for example, 65 mm or more and 110 mm or less, and preferably 80 mm or more and 95 mm or less. The first lip portion 36 is a portion that is held by the holding portion 22 of the lip mold 20 (refer to FIG. 2A). A length L1, in the direction of the central axis line C, of the first lip portion 36 may be, for example, 8.0 mm or more and 15 mm or less. A length L2, in the direction of the central axis line C, of the first lip portion 36 that is held in contact with the lip mold 20 is short, and may be, for example, 4.0 mm or more and 7.0 mm or less, or about 5 mm (4.5 mm or more and 5.5 mm or less). In addition, outer shapes of the first lip portion 36 and the first body portion 34 are each a circular shape in a top view or in a horizontal cross section. Further, a length L, in the direction of the central axis line C, of the preform 30 may be, for example, 30 mm or more and 60 mm or less, and may be shorter than the diameter D of the first lip portion.

The first lip portion 36 has an annular flange portion 37 provided at an edge located on an opposite side of the first body portion 34 and protruding outwardly. The preform 30 has an annular protruding portion 38 provided on an outer peripheral portion of the first lip portion 36 closer to the first body portion 34 than the flange portion 37 and protruding outwardly. The flange portion 37 and the protruding portion 38 are formed along a circumferential direction of the first lip portion. An outwardly protruding length of the flange portion 37 may be shorter than the length of the first lip portion 36 in the direction of the central axis line C. The outwardly protruding length L3 of the flange portion 37 may be, for example, 1.0 mm or more and 3.0 mm or less, and more preferably 1.5 mm or more and 2.5 mm or less. An outwardly protruding length of the protruding portion 38 may be shorter than the outwardly protruding length of the flange portion 37. The outwardly protruding length L4 of the protruding portion 38 may be, for example, 0.3 mm or more and 1.5 mm or less, and more preferably 0.4 mm or more and 0.6 mm or less.

A thickness Th1 of the first bottom portion 32 may be 1.5 mm or more and 2.0 mm or less. A ratio Th2/Th1 of a thickness Th2 of the first body portion 34 (maximum thickness of the first body portion 34) to the thickness Th1 of the first bottom portion 32 may be 0.8 or more and 1.4 or less, and more preferably 0.95 or more and 1.25 or less. In a cross section of the preform 30 (FIG. 3) obtained by cutting the preform 30 along a plane along the central axis line C of the first lip portion 36, an inclination θ of the first body portion 34 with respect to the central axis line C may be 20° or more and 70° or less, or may be 30° or more and 50° or less. A shape of the cross section of the preform may be substantially triangular or substantially trapezoidal.

Here, returning to FIGS. 2A and 2B, the lip mold 20 is again described. The holding portion 22 of the lip mold 20 has a lip outer periphery defining portion 24 configured to define an outer peripheral portion of the preform 30 excluding the flange portion 37 of the first lip portion 36 when molding the preform 30 in the injection molding part 11. The lip outer periphery defining portion 24 has a concave portion 26 configured to define the protruding portion 38 of the preform 30 when molding the preform 30 in the injection molding part 11.

Figure 4:
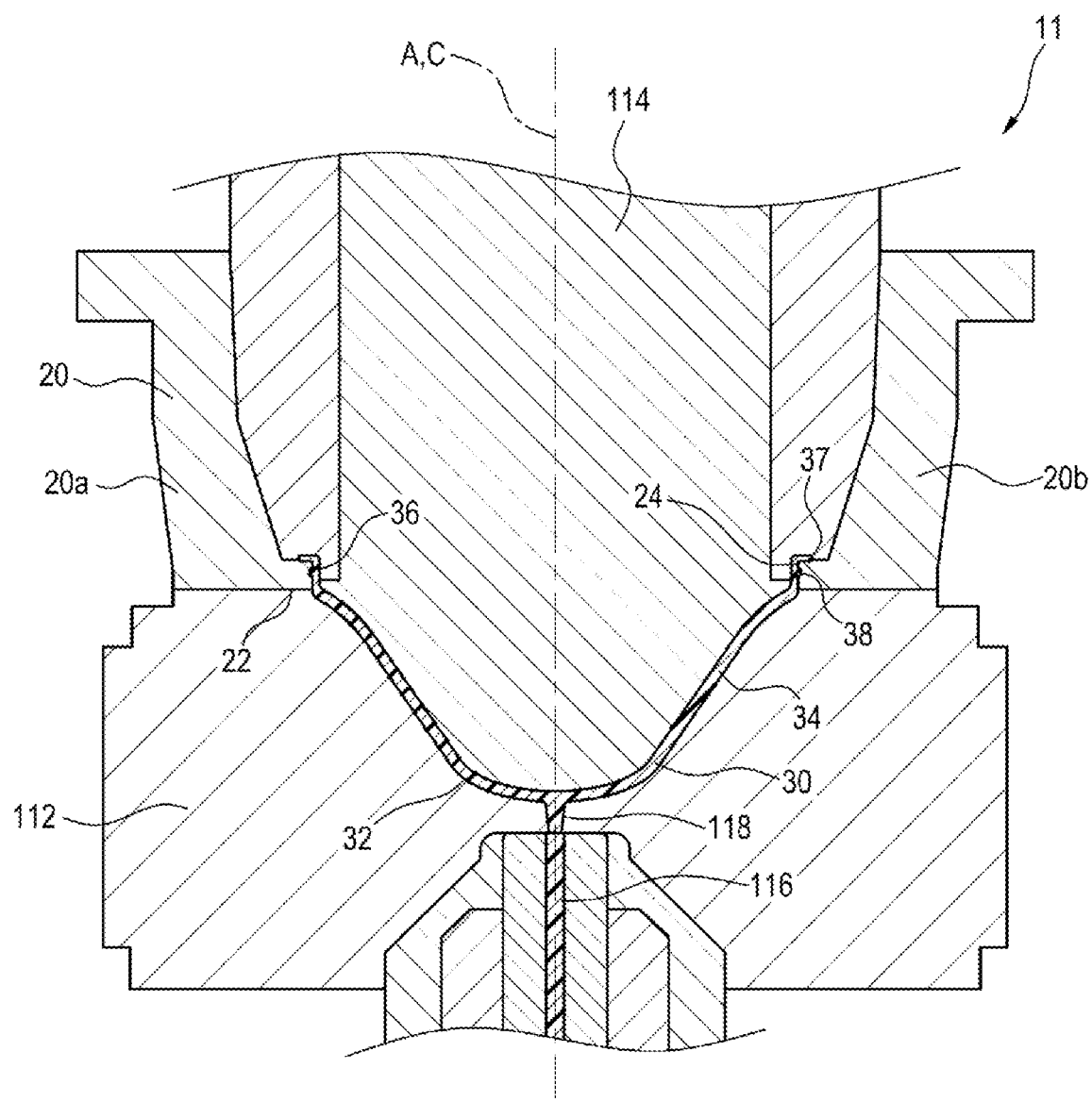
FIG. 4 is a view showing an injection molding part of the manufacturing apparatus for manufacturing a resin wide-mouth container according to the embodiment.

Subsequently, the injection molding part 11 is described with reference to FIG. 4. FIG. 4 is a schematic cross-sectional view showing an aspect of the injection molding part 11. The injection molding part 11 includes an injection molding mold including an injection core mold 114 and an injection cavity mold 112. The injection molding part 11 is configured to pour a synthetic resin material such as a polyester-based resin (for example, PET: polyethylene terephthalate) into (by filling molten resin into) a space in a shape of the preform 30 via a runner 116 and a gate 118, to injection-mold the preform 30, in which the space is formed by mold-clamping the injection core mold 114, the injection cavity mold 112, and the lip mold 20. A cooling medium that is, for example, 5° C. to 20° C. flows inside the injection core mold 114 and the injection cavity mold 112 to maintain the molds at a low temperature during molding.

Figure 5:
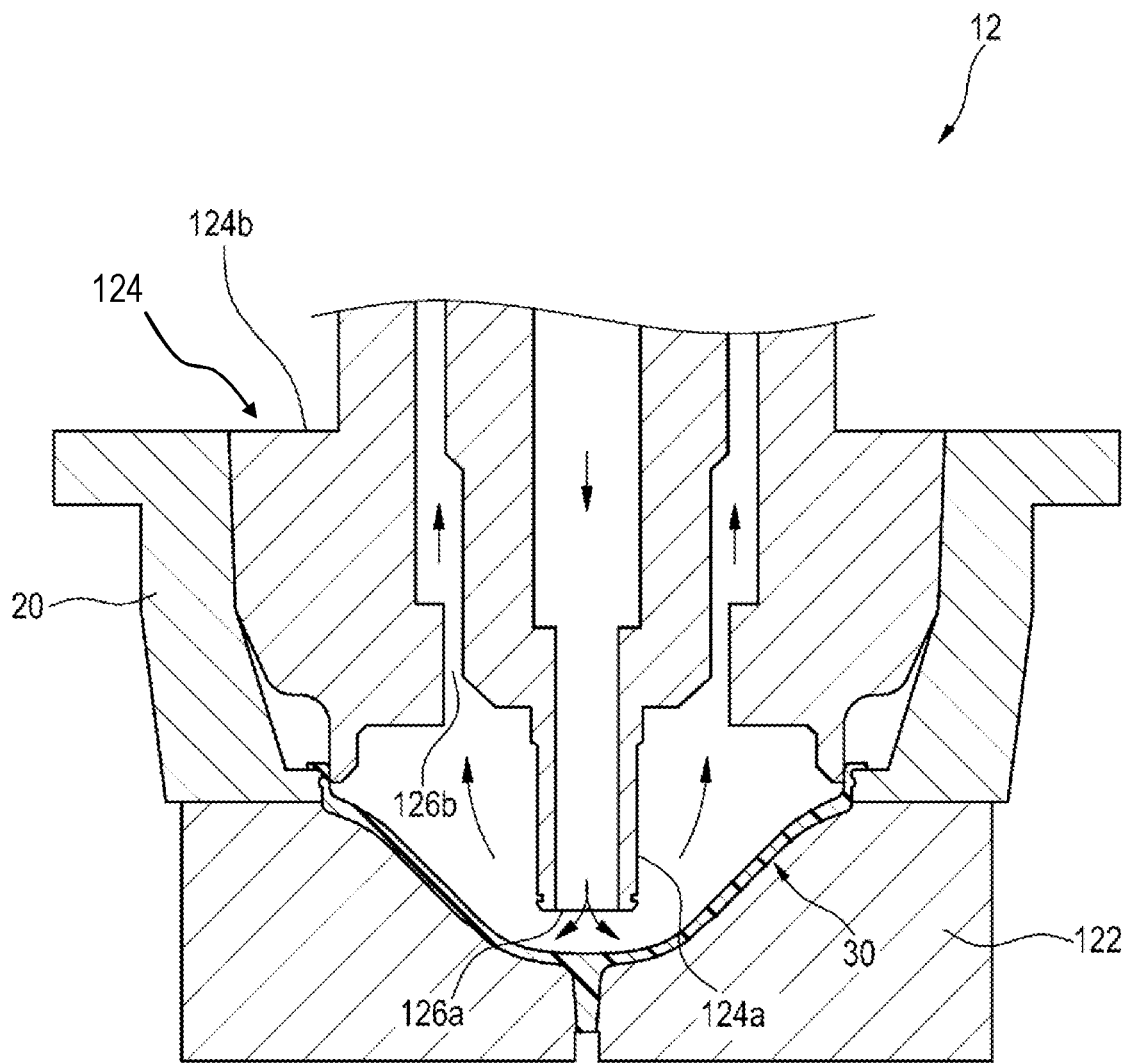
FIG. 5 is a view showing a temperature adjustment part according to the embodiment.

Here, with reference to FIG. 5, the temperature adjustment part 12 shown in FIG. 1 is described. FIG. 5 is a schematic cross-sectional view showing an aspect of the temperature adjustment part 12. The temperature adjustment part 12 includes a mold unit, for performing temperature adjustment blow (cooling blow), including a cavity mold (cavity mold for temperature adjustment) 122 configured to accommodate the preform 30 and an air introduction member 124 configured to contact the preform 30 in an airtight manner and to send air to an inside of the preform 30.

The cavity mold 122 has a fixed-type (single unit-type) structure configured to define a space having substantially the same shape as the preform 30 manufactured by the injection molding part 11. A temperature adjustment medium (cooling medium) that is, for example, 20° C. to 100° C., more preferably 60° C. to 90° C. flows inside the cavity mold 122 to keep the temperature low.

The air introduction member 124 includes a rod member 124a that is hollow and includes an air ventilation hole provided therein, and a fitting core (blow core member for temperature adjustment) 124b. The rod member 124a is accommodated in the fitting core 124b to be movable up and down. A tip end of the rod member 124a is provided with an inner ventilation port 126a through which air can be ejected or sucked. A temperature of the air is appropriately set corresponding to a thickness of the preform 30 or a wide-mouth container 40. The fitting core 124b is configured to be fitted (closely contacted) to the first lip portion 36 in a case where the air introduction member 124 is inserted into (airtightly contacted to) the preform 30. Thereby, it is possible to prevent the air in the preform 30 from leaking from the first lip portion 36 toward an outside of the fitting core 124b. A gap between the rod member 124a and the fitting core 124b is an air ventilation path for supplying/discharging the air with respect to the preform 30. A gap formed by a tip end of the fitting core 124b and the rod member 124a configures an outer ventilation port 126b through which air can be ejected or sucked. The inner ventilation port 126a and the outer ventilation port 126b may serve as a blowing port and a discharge port, respectively.

Note that, instead of or in combination with the above-described method, the temperature adjustment part 12 can adopt a method of sandwiching the preform with a temperature adjustment cavity mold and a temperature adjustment core mold (temperature adjustment rod mold), and a temperature adjustment means such as various infrared heater types, a RED type, an electromagnetic wave heating type, or the like. Note that, the temperature adjustment part 12 may be omitted. For example, a thickness distribution of the wide-mouth container can be improved by employing the temperature adjustment part 12. However, it is preferable from a viewpoint of manufacturing efficiency to adopt a method in which the preform is cooled inside and outside simultaneously by ventilating air inside the preform in a state in which the preform is brought into contact with the temperature adjustment cavity mold described above. In addition, when adopting the method, it is preferable to make a cooling intensity by the outer temperature adjustment cavity mold stronger than a cooling intensity by the inner air.

Figure 6:
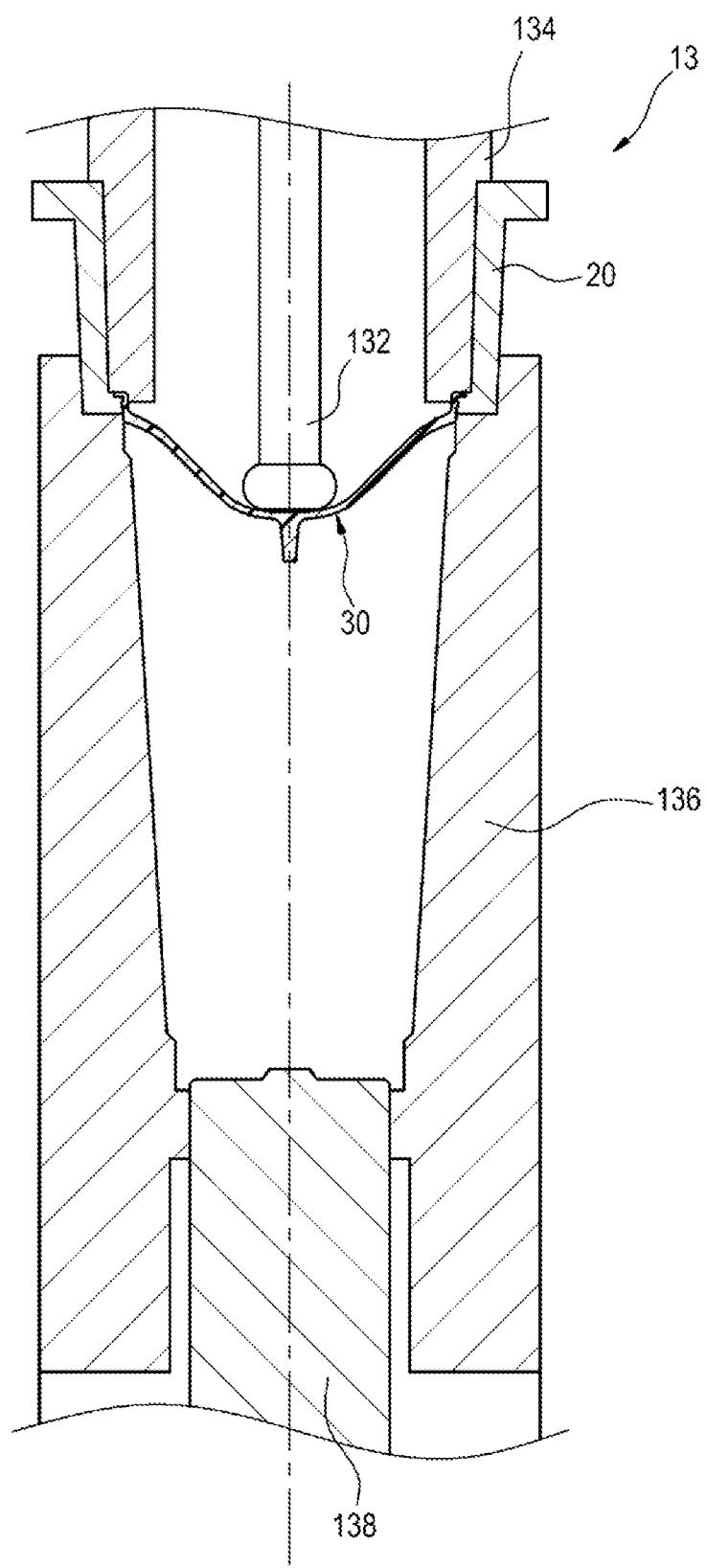
FIG. 6 is a view showing a blow molding part according to the embodiment.

Here, with reference to FIG. 6, the blow molding part 13 shown in FIG. 1 is described. FIG. 6 is a schematic cross-sectional view showing an aspect of the blow molding part 13. The blow molding part 13 includes a stretch rod 132, a blow core mold 134, a blow cavity mold 136, and a blow bottom mold 138. The blow molding part 13 is configured to introduce air from the blow core mold 134 to inflate the preform 30 into a shape defined by the blow cavity mold 136 and the blow bottom mold 138 and to form a wide-mouth container while stretching the injection-molded preform 30 with, for example, the stretch rod 132.

Figure 7:
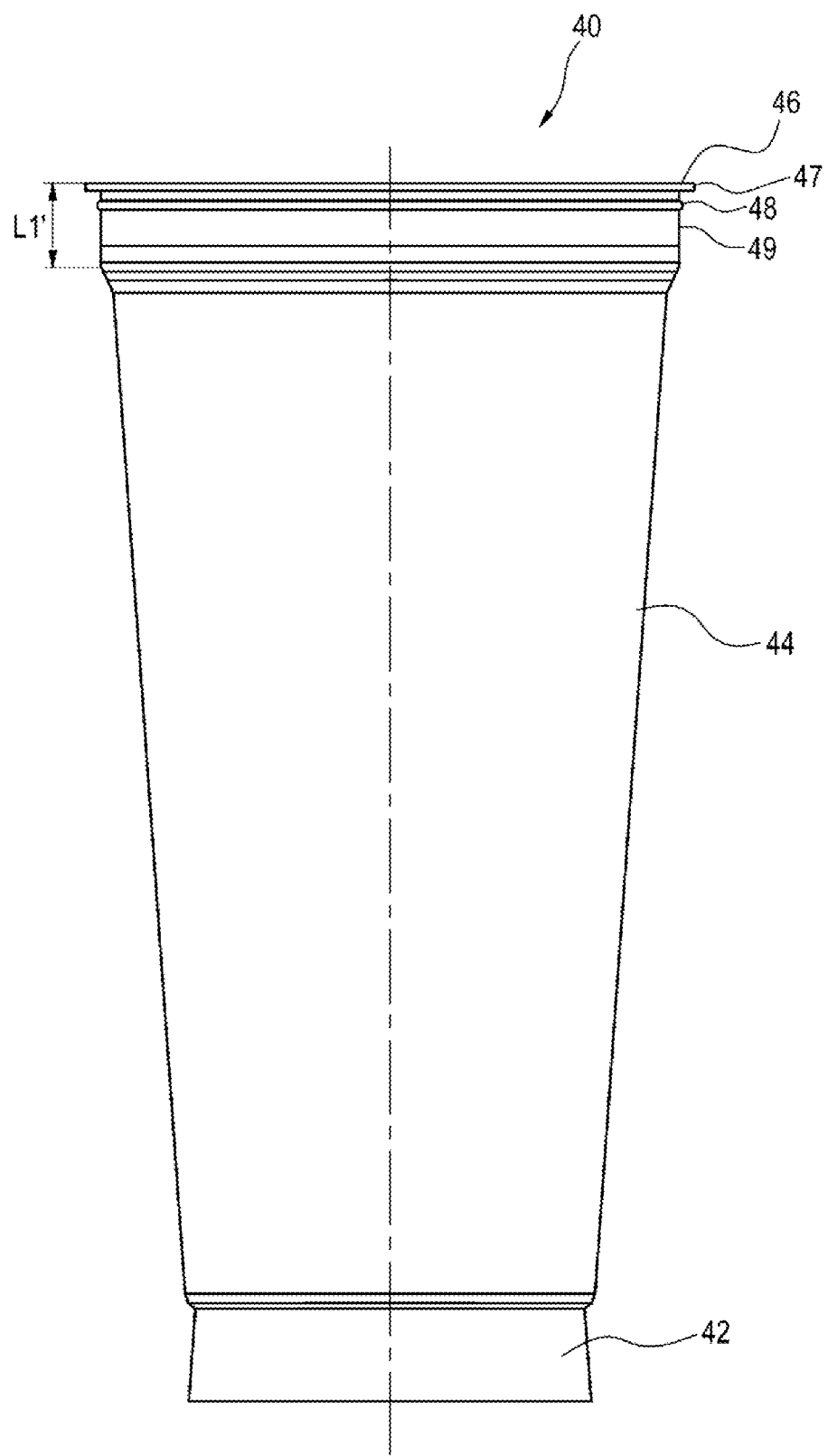
FIG. 7 is a view showing a resin wide-mouth container according to the embodiment.

Subsequently, with reference to FIG. 7, a wide-mouth container 40 that is molded by the manufacturing apparatus 10 of the present embodiment is described. FIG. 7 is a side view of the wide-mouth container 40. The wide-mouth container 40 is a cup-shaped container including a second bottom portion 42, a second body portion 44 continuous with the second bottom portion 42, and a second lip portion (opening portion) 46 with a cylindrical wide mouth continuous with the second body portion 44 on an opposite side of the second bottom portion 42. The second lip portion 46 includes an annular flange portion 47 provided at an edge located on an opposite side of the second body portion 44 and protruding outwardly, and an annular protruding portion 48 provided on an outer peripheral portion of the second lip portion 46 closer to the second body portion 44 than the flange portion 47 and protruding outwardly. An outer diameter of the flange portion 47 of the second lip portion 46 is the maximum diameter of the wide-mouth container 40. A vertical stretch ratio (SVR) of the wide-mouth container 40 to the preform 30 may be 4.0 or more and 6.0 or less. A diameter of the second lip portion 46 of the wide-mouth container 40, and sizes and shapes of the flange portion 47 and the protruding portion 48 are the same as those of the first lip portion 36, the flange portion 37, and the protruding portion 38 of the preform 30, respectively. A length L1' of the second lip portion 46 of the wide-mouth container 40 may be longer than the length L1 of the first lip portion 36 by stretching the first lip portion 36 of the preform 30 in the blow molding step. A parting line of the lip mold 20 is formed on the second lip portion 46. More specifically, two vertical line-shaped parting lines extending in the vertical direction as traces of contact surfaces of the split molds 20a and 20b configuring the lip mold 20, and one annular parting line extending in a circumferential direction as a trace of a contact surface of the lip mold 20 and the injection cavity mold 112 are formed on the first lip portion 36 and the second lip portion 46. These parting lines are formed in a range of the holding portion 22 of the lip mold 20 (range of the length L2 of the first lip portion 36 of the preform 30). Further, an injection mark (circular in cross section) of the molten resin ejected from the gate 118 is formed on a central region of a lower surface of the second bottom portion 42.

Subsequently, a manufacturing method for manufacturing a wide-mouth container according to the present embodiment is described. The manufacturing method is a hot parison-type method including an injection molding step of injection-molding the preform 30, a temperature adjustment step of adjusting a temperature of the injection-molded preform 30 to an appropriate temperature for blow molding, and a blow molding step of blow molding the preform 30 to mold a wide-mouth container 40.

The injection molding step is described with reference to FIG. 4. In the injection molding step, the molten resin is injected, via the runner 116 and the gate 118, into the space in the shape of the preform 30 formed by mold-clamping the injection core mold 114, the injection cavity mold 112, and the lip mold 20. After a predetermined time has elapsed, the injection core mold 114 and the lip mold 20 are pulled up to demold the preform 30 from the injection cavity mold 112. At this time, the protruding portion 38 of the preform 30 is engaged with the concave portion 26 of the lip mold 20 (refer to FIG. 2B). Further, the flange portion 37 of the preform 30 is caught by the holding portion 22 of the lip mold 20. In this state, the first lip portion 36 is held by the lip mold 20 and the preform 30 is demolded from the injection cavity mold 112. Here, in a case where the time after the injection of the molten resin is completed until the preform 30 is demolded is shortened, the preform 30 is demolded in a high temperature state. When demolding the preform 30 from the injection molding mold at a high temperature, a cooling time in the injection molding mold after the injection of the molten resin is completed until the preform 30 is demolded, may be set to, for example, 0.0 to 1.5 seconds. Note that, the above-described "injection of molten resin" refers to a resin filling step including a pressure holding step. The time for the resin filling step may be set to, for example, 2.5 to 4.5 seconds. In addition, a predetermined time until the demolded preform 30 is conveyed to the temperature adjustment step may be set to a time (for example, 2.0 to 6.0 seconds) in which, for example, an outer surface temperature of the preform 30 rises rapidly after demolding and becomes about 110° C. or higher and 140° C. or lower, when demolding the preform 30 from the injection molding mold at a high temperature.

In the temperature adjustment step, the temperature of the preform 30 molded in the injection molding step is adjusted to an appropriate temperature for blow molding, in the temperature adjustment part 12 described above (FIG. 5). First, the preform 30 is accommodated in the preform-shaped space of the temperature cavity mold 122. Continuously, the air introduction member 124 is inserted into (airtightly contacted to) the preform 30 accommodated in the cavity mold 122. Subsequently, cooling blow of opening the inner ventilation port 126a to introduce the air from the inner ventilation port 126a and discharging the air to an outside of the preform 30 via the outer ventilation port 126b is performed. At this time, since the air is continuously ejected from the inner ventilation port 126a, the preform 30 is cooled from the inner side by convection of the air flowing in the preform 30. Further, since the preform 30 is in continuous contact with the cavity mold 122, the preform is also cooled from the outer side and temperature-adjusted, and a temperature unevenness caused during the injection molding is also reduced.

Note that, although the temperature adjustment step may be omitted, the thickness distribution of the wide-mouth container can be improved by adopting the temperature adjustment part 12, for example. In addition, in a case where the preform 30 is demolded at a high temperature in the injection molding step, the preform 30 may be cooled to a predetermined temperature with cooling air or the like in the temperature adjustment step, and, for example, the outer surface temperature of the preform 30 may be lowered by about 30° C. or higher and 50° C. or lower from a time when the preform is carried into the temperature adjustment part 12. By demolding the preform 30 at a high temperature in the injection molding step and cooling the preform in the temperature adjustment step, it is possible to mold the wide-mouth container 40 having an excellent appearance while shortening the cycle time. Further, in the temperature adjustment step, a cooling rod piece configured to contact an inner surface of the first bottom portion 32 of the preform 30 may be provided to a tip end of the rod member 124a.

In the blow molding step, the preform 30 is accommodated in the cavity defined by the blow cavity mold 136 and the blow bottom mold 138 corresponding to the shape of the wide-mouth container 40 (refer to FIG. 7), and then, the preform 30 is inflated to manufacture the wide-mouth container 40 by introducing blow air from the blow core mold 134, while optionally stretching the preform by the stretch rod 132 (FIG. 6). Thereafter, the wide-mouth container 40 is released from the mold of the blow molding part 13, and the wide-mouth container 40 is conveyed to the take-out part 14 and the container is taken out. By the above procedure, the wide-mouth container 40 is manufactured. Note that, the wide-mouth container that can be manufactured in the manufacturing method of the present embodiment is not limited to the specific wide-mouth container 40 shown in FIG. 7.

The first lip portion 36 of the preform 30 and the second lip portion 46 of the wide-mouth container 40 described in the present embodiment correspond to each other, and the length of these lip portions in the direction of the central axis line C of the preform 30 is short. Therefore, when demolding the preform and the wide-mouth container from the mold in the injection molding step, the preform and the wide-mouth container is likely to be detached from the lip mold 20.

In the hot parison-type manufacturing method including the injection molding step and the blow molding step described in the present embodiment, the preform 30 is injection-molded such that the first lip portion 36 of the preform 30 includes the protruding portion 38, and the protruding portion 38 of the preform 30 is engaged with the concave portion 26 of the lip mold 20 when pulling up the preform 30 from the injection cavity mold 112, so that detachment of the preform 30 can be prevented (FIGS. 2B and 4). Thereby, the wide-mouth container 40 can be suitably manufactured.

Further, the stretch ratio in the vertical direction, with respect to the preform 30, of the wide-mouth container 40 described in the present embodiment is large, and thus, the thickness distribution of the body portion in the vertical direction becomes likely to be non-uniform. Further, whitening (crystallization) is likely to occur in a portion at the periphery of the gate during the injection molding of the second bottom portion 42 of the wide-mouth container 40.

In the hot parison-type manufacturing method, in which the preform 30 is demolded at the high temperature in the injection molding step, including the injection molding step, the temperature adjustment step, and the blow molding step described in the present embodiment, the preform 30 is injection-molded such that the thickness Th1 of the first bottom portion 32 becomes 1.5 mm or more or the ratio of the thickness Th1 of the first bottom portion 32 to the thickness Th2 of the first body portion 34 becomes 0.8 or more (refer to FIG. 3) and the inclination of the first body portion 34 with respect to the central axis line C is 20° or more and 70° or less (refer to FIG. 3) in the cross section of the preform 30 obtained by cutting the preform 30 along the plane along the central axis line C of the first lip portion 36, and is cooled in the temperature adjustment step. Thereby, the thickness distribution in the vertical direction of the wide-mouth container 40 manufactured by the high-speed ISBM method can be improved. In addition, the whitening of the wide-mouth container 40 at the periphery of the gate 118 of the molten resin in the injection molding step can be suitably reduced, and a wide-mouth container having a more excellent appearance can be manufactured (refer FIG. 4). Further, the formability (transferability) of the second bottom portion 42 of the wide-mouth container 40 is also improved.

In fact, according to consideration by the inventors, it was found that in a case where the thickness Th1 of the first bottom portion 32 of the preform 30 was 1.4 mm and the thickness Th2 of the first body portion 34 was 2.0 mm, the whitening of the wide-mouth container 40 occurring at the periphery of the gate was slightly observed. On the other hand, in a case where the thickness Th1 of the first bottom portion 32 of the preform 30 was 1.8 mm and the thickness Th2 of the first body portion 34 was 2.0 mm, the whitening of the wide-mouth container 40 occurring at the periphery of the gate hardly occurred and the high transparency was observed. It is considered that a reason for the above results is that the increase in distance between the gate 118 and the bottom portion of the injection core mold 114 reduces a resin resistance at the time of inflow of the molten resin and also reduces shear heat generation, and the first bottom portion 32 of the preform 30 after molding is suppressed from being an abnormal high-temperature state, and as a result, whitening (crystallization) due to slow cooling of the first bottom portion 32 is reduced. In addition, it is considered that the first body portion 34 of the preform 30 is made thicker than the related art, so that even after cooling by the temperature adjustment step of the high-speed ISBM method, sufficient residual heat is secured before blow molding, which is considered to be effective in improving the thickness unevenness of the second body portion 44 of the wide-mouth container 40.

Further, in the molding of the wide-mouth container 40 described in the present embodiment, the surface roughness of the inner surface and the outer surface of the wide-mouth container 40 may be made different by roughening the cavity surface of the temperature adjustment cavity mold or blow cavity mold. Thereby, when overlapping or separating the wide-mouth containers 40 each other, a resistance between the wide-mouth containers 40 can be reduced and handleability can be improved.

Note that, the present invention is not limited to the above embodiment and can be freely modified and improved as appropriate. In addition, the material, shape, dimension, numerical value, form, number, arrangement location, and the like of each element in the above embodiment are arbitrary and are not particularly limited as long as the present invention can be achieved.

Hereinafter, aspects extracted from the above embodiment and modifications thereof are listed.

[1] A manufacturing method, being a hot parison-type, for manufacturing a resin wide-mouth container, the manufacturing method at least including:

an injection molding step of injection-molding a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and a blow molding step of blow molding the injection-molded preform to manufacture a resin wide-mouth container, in which, in the injection molding step, molten resin is injected into a space in a shape of the preform to injection-mold the preform, the space being formed by mold-clamping an injection core mold, an injection cavity mold, and a lip mold such that a protruding portion protruding outwardly is formed on an outer peripheral portion of the first lip portion closer to the first body portion than the flange portion, and the first lip portion including the protruding portion is held by the lip mold including a concave portion configured to engage with the protruding portion, to demold the preform from an injection molding mold.

[2] The manufacturing method according to [1], further including:

a temperature adjustment step, between the injection molding step and the blow molding step, of adjusting a temperature of the injection-molded preform to an appropriate temperature for blow molding, in which, in the injection molding step, the preform is injection-molded such that a thickness of the first bottom portion becomes 1.5 mm or more, or a ratio of the thickness of the first bottom portion to a thickness of the first body portion becomes 0.8 or more, and the preform is injection-molded such that an inclination of the first body portion with respect to the central axis line becomes 20° or more and 70° or less, in a cross section of the preform obtained by cutting the preform along a plane along a central axis line of the first lip portion, and in which the preform is demolded at a high temperature in the injection molding step, the preform is cooled to an appropriate temperature for blow molding in the temperature adjustment step, and a resin wide-mouth container is manufactured by stretch blow molding in the blow molding step.

[3] The manufacturing method according to [1] or [2], in which, in the blow molding step, a resin wide-mouth container is manufactured, the resin wide-mouth container including a second bottom portion, a second body portion continuous with the second bottom portion, and a second lip portion having a cylindrical wide-mouth continuous with the second body portion on an opposite side of the second bottom portion.

[4] A manufacturing apparatus, being a hot parison-type, for manufacturing a resin wide-mouth container, the manufacturing apparatus at least including:

an injection molding part configured to injection-mold a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and a blow molding part configured to blow mold the injection-molded preform to manufacture a resin wide-mouth container, in which the injection molding part is configured to inject molten resin into a space in a shape of the preform to injection-mold the preform, the space being formed by mold-clamping an injection core mold, an injection cavity mold, and a lip mold, in which the lip mold includes a lip outer periphery defining portion configured to define an outer peripheral portion, excluding the flange portion, of the first lip portion of the preform, and in which the lip outer periphery defining portion includes a concave portion configured to define a protruding portion protruding outwardly on an outer peripheral portion of the first lip portion closer to the first body portion than the flange portion.

[5] A resin wide-mouth container including:
a bottom portion;
a body portion continuous with the bottom portion; and
a lip portion having a cylindrical wide mouth continuous with the body portion on an opposite side of the bottom portion, in which the lip portion includes a flange portion provided at an edge located on an opposite side of the bottom portion and protruding outwardly, and a protruding portion provided on an outer peripheral portion of the lip portion closer to the body portion than the flange portion and protruding outwardly, and in which an outer diameter of the lip portion is a maximum diameter of the wide-mouth container.

The present application is based on the Japanese Patent Application (Japanese Patent Application No. 2020-078536) filed on Apr. 27, 2020, which is entirely incorporated by reference. Also, all references cited herein are incorporated in their entirety.

REFERENCE SIGNS LIST

10: manufacturing apparatus, 11: injection molding part, 12: temperature adjustment part, 13: blow molding part, 14: take-out part, 15: injection device, 16: conveying means, 20: lip mold, 22: holding portion, 24: lip outer periphery defining portion, 26: concave portion, 30: preform, 31: gate mark, 32: first bottom portion, 34: first body portion, 36: first lip portion, 37: flange portion, 38: protruding portion, 40: wide-mouth container, 42: second bottom portion, 44: second body portion, 46: second lip portion, 112: injection cavity mold, 114: injection core mold, 116: runner, 118: gate, 122: cavity mold, 124: air introduction member, 124a: rod member, 124b: fitting core, 126a: inner ventilation port, 126b: outer ventilation port, 132: stretch rod, 134: blow core mold, 136: blow cavity mold, 138: blow bottom mold

The invention claimed is:

1. A manufacturing method, being a hot parison-type, for manufacturing a resin wide-mouth container, the manufacturing method at least comprising:

injection-molding a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and blow-molding the injection-molded preform to manufacture a resin wide-mouth container, wherein, during the injection molding,
molten resin is injected into a space in a shape of the preform to injection-mold the preform, the space being formed by mold-clamping an injection core mold, an injection cavity mold, and a lip mold such that a protruding portion protruding outwardly is formed on an outer peripheral portion of the first lip portion closer to the first body portion than the flange portion, and the first lip portion including the protruding portion is held by the lip mold including a concave portion configured to engage with the protruding portion, to demold the preform from an injection molding mold, wherein, during the injection molding, the preform is injection molded such that an outwardly protruding length of the protruding portion of the first lip portion is less than an outwardly protruding length of the flange portion of the first lip portion, and wherein the preform is held and demolded with a holding portion of the lip mold caught by the flange portion, and with the concave portion of the lip mold engaged in the protruding portion.

2. The manufacturing method according to claim 1, further comprising:

between the injection molding and the blow molding, adjusting a temperature of the injection-molded preform to an appropriate temperature for blow molding, wherein, during the injection molding,
the preform is injection-molded such that a thickness of the first bottom portion becomes 1.5 mm or more, or a ratio of the thickness of the first bottom portion to a thickness of the first body portion becomes 0.8 or more, and the preform is injection-molded such that an inclination of the first body portion with respect to the central axis line becomes 20° or more and 70° or less, in a cross section of the preform obtained by cutting the preform along a plane along a central axis line of the first lip portion, and wherein the preform is demolded at a high temperature during the injection molding, the preform is cooled to an appropriate temperature for blow molding during the temperature adjustment, and a resin wide-mouth container is manufactured by stretch blow molding during the blow molding.

3. The manufacturing method according to claim 1,
wherein, during the blow molding, a resin wide-mouth container is manufactured, the resin wide-mouth container including a second bottom portion, a second body portion continuous with the second bottom portion, and a second lip portion having a cylindrical wide-mouth continuous with the second body portion on an opposite side of the second bottom portion.

4. A manufacturing apparatus, being a hot parison-type, for manufacturing a resin wide-mouth container, the manufacturing apparatus at least comprising:
an injection molding part configured to injection-mold a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and
a blow molding part configured to blow-mold the injection-molded preform to manufacture a resin wide-mouth container,
wherein the injection molding part is configured to inject molten resin into a space in a shape of the preform to injection-mold the preform, the space being formed by mold-clamping an injection core mold, an injection cavity mold, and a lip mold,
wherein the lip mold includes a lip outer periphery defining portion configured to define an outer peripheral portion, excluding the flange portion, of the first lip portion of the preform,
wherein the lip outer periphery defining portion includes a concave portion configured to define a protruding portion protruding outwardly on an outer peripheral portion of the first lip portion closer to the first body portion than the flange portion, and
wherein the concave portion is configured to define the protruding portion protruding outwardly on the outer peripheral portion of the first lip portion such that the protruding portion protrudes less than the flange portion, and
wherein the preform is configured to be held and demolded with a holding portion of the lip mold caught by the flange portion, and with the concave portion of the lip mold engaged in the protruding portion.

5. The manufacturing method according to claim 1, wherein, during the injection molding,
the preform is injection molded such that the outwardly protruding length of the protruding portion of the first lip portion is 0.3 mm or more and 1.5 mm or less.

6. The manufacturing method according to claim 1, wherein, during the injection molding,
the preform is injection molded such that the outwardly protruding length of the protruding portion of the first lip portion is 0.4 mm or more and 0.6 mm or less.

7. The manufacturing method according to claim 1, wherein, during the injection molding,
the preform is injection molded such that the outwardly protruding length of the flange portion of the first lip portion is 1.0 mm or more and 3.0 mm or less.

8. The manufacturing method according to claim 1, wherein, during the injection molding,
the preform is injection molded such that the outwardly protruding length of the flange portion of the first lip portion is 1.5 mm or more and 2.5 mm or less.

9. The manufacturing method according to claim 3, wherein a vertical stretch ratio of the wide-mouth container, manufactured during the blow molding, and the preform, injection-molded during the injection molding, is 4.0 or more and 6.0 or less.

10. The manufacturing apparatus according to claim 4, wherein the concave portion is configured to define the protruding portion protruding outwardly on the outer peripheral portion of the first lip portion such that the protruding portion protrudes 0.3 mm or more and 1.5 mm or less.

11. The manufacturing apparatus according to claim 4, wherein the concave portion is configured to define the protruding portion protruding outwardly on the outer peripheral portion of the first lip portion such that the protruding portion protrudes 0.4 mm or more and 0.6 mm or less.

12. A manufacturing method, being a hot parison-type, for manufacturing a resin wide-mouth container, the manufacturing method at least comprising:
injection-molding a resin bottomed preform including a first bottom portion, a first body portion continuous with the first bottom portion, and a first lip portion having a cylindrical wide mouth continuous with the first body portion on an opposite side of the first bottom portion, the first lip portion including a flange portion that is provided at an edge located on an opposite side of the first body portion and that protrudes outwardly; and
blow-molding the injection-molded preform to manufacture a resin wide-mouth container,
wherein, during the injection molding,
molten resin is injected into a space in a shape of the preform to injection-mold the preform, the space being formed by mold-clamping an injection core mold, an injection cavity mold, and a lip mold such that a protruding portion protruding outwardly is formed on an outer peripheral portion of the first lip portion closer to the first body portion than the flange portion, and
the first lip portion including the protruding portion is held by the lip mold including a concave portion configured to engage with the protruding portion, to demold the preform from an injection molding mold, and
wherein, during the injection molding, the preform is injection molded such that an outwardly protruding length of the protruding portion of the first lip portion is 0.3 mm or more and 1.5 mm or less.

* * * * *